(12) United States Patent
Bromberg et al.

(10) Patent No.: US 9,057,032 B2
(45) Date of Patent: Jun. 16, 2015

(54) HIGH PRESSURE GASIFIER SYSTEM USING ELECTRICALLY ASSISTED HEATING

(75) Inventors: Leslie Bromberg, Sharon, MA (US); Daniel R. Cohn, Cambridge, MA (US); Jeffrey E. Surma, Richland, WA (US); James A. Batdorf, Kennewick, WA (US); David A. Lamar, West Richland, WA (US)

(73) Assignee: InEnTec Inc., Bend, OR (US)

( * ) Notice: Subject to any disclaimer, the term of this patent is extended or adjusted under 35 U.S.C. 154(b) by 577 days.

(21) Appl. No.: 12/787,266

(22) Filed: May 25, 2010

(65) Prior Publication Data

US 2011/0126461 A1    Jun. 2, 2011

Related U.S. Application Data

(60) Provisional application No. 61/181,099, filed on May 26, 2009.

(51) Int. Cl.
| | | |
|---|---|---|
| *C10J 3/02* | (2006.01) | |
| *C10J 3/18* | (2006.01) | |
| *C10J 3/72* | (2006.01) | |
| *C10J 3/86* | (2006.01) | |
| *C10J 3/57* | (2006.01) | |

(Continued)

(52) U.S. Cl.
CPC .... *C10J 3/86* (2013.01); *C10J 3/18* (2013.01); *C10J 3/57* (2013.01); *C10J 3/84* (2013.01); *C10J 2200/09* (2013.01); *C10J 2200/12* (2013.01); *C10J 2300/1238* (2013.01); *C10J 2300/1884* (2013.01); *F23G 5/085* (2013.01); *Y02E 20/12* (2013.01); *C10J 3/78* (2013.01); *F16J 15/16* (2013.01); *F28D 19/02* (2013.01)

(58) Field of Classification Search
USPC ............................................................ 48/61
See application file for complete search history.

(56) References Cited

U.S. PATENT DOCUMENTS

| | | |
|---|---|---|
| 3,611,366 A | 10/1971 | Hewlett |
| 3,841,239 A | 10/1974 | Nakamura et al. |

(Continued)

FOREIGN PATENT DOCUMENTS

| | | | |
|---|---|---|---|
| JP | 2002048321 A | * | 2/2002 |
| WO | 2008/092964 A1 | | 8/2008 |

(Continued)

OTHER PUBLICATIONS

International Search Report and Written Opinion of application No. PCT/US10/36250 mailed Dec. 13, 2010.

(Continued)

*Primary Examiner* — Matthew Merkling
(74) *Attorney, Agent, or Firm* — Dorsey & Whitney LLP

(57) ABSTRACT

The problems of the prior art are overcome by the apparatus and method disclosed herein. The reactor vessel of a plasma gasifier is operated at high pressure. To compensate for the negative effects of high pressure, various modifications to the plasma gasifier are disclosed. For example, by moving the slag, more material is exposed to the plasma, allowing better and more complete processing thereof. In some embodiments, magnetic fields are used to cause movement of the slag and molten metal within the vessel. An additional embodiment is to add microwave heating of the slag and/or the incoming material. Microwave heating can also be used as an alternative to plasma heating in a high pressure gasification system.

23 Claims, 6 Drawing Sheets

(51) Int. Cl.
  *C10J 3/84* (2006.01)
  *F23G 5/08* (2006.01)
  *C10J 3/78* (2006.01)
  *F16J 15/16* (2006.01)
  *F28D 19/02* (2006.01)

(56) References Cited

U.S. PATENT DOCUMENTS

| | | | |
|---|---|---|---|
| 4,007,015 A | 2/1977 | Barber | |
| 4,060,913 A | 12/1977 | Yoshida et al. | |
| 4,238,634 A | 12/1980 | Krogsrud | |
| 4,431,612 A | 2/1984 | Bell et al. | |
| 4,457,002 A | 6/1984 | Mathgen et al. | |
| 4,769,045 A | 9/1988 | Grindley | |
| 5,143,000 A | 9/1992 | Camacho | |
| 5,666,891 A | 9/1997 | Titus et al. | |
| 5,811,752 A * | 9/1998 | Titus et al. | 219/121.37 |
| 5,847,353 A | 12/1998 | Titus et al. | |
| 5,961,870 A | 10/1999 | Hogan | |
| 6,004,384 A | 12/1999 | Caudle | |
| 6,018,542 A | 1/2000 | Berger | |
| 6,066,825 A | 5/2000 | Titus et al. | |
| 6,200,430 B1 | 3/2001 | Robert | |
| RE37,134 E | 4/2001 | Wilson | |
| 6,298,651 B1 | 10/2001 | Iijima | |
| 6,422,822 B1 | 7/2002 | Holmes | |
| 6,466,605 B1 * | 10/2002 | Wittle et al. | 373/108 |
| 6,514,469 B1 * | 2/2003 | Kado et al. | 422/186.21 |
| 6,638,396 B1 | 10/2003 | Hogan | |
| 6,640,752 B1 | 11/2003 | Counterman | |
| 7,037,484 B1 | 5/2006 | Brandenburg | |
| 7,080,505 B2 | 7/2006 | Koermer et al. | |
| 7,655,703 B2 | 2/2010 | Batdorf | |
| 2001/0013308 A1 | 8/2001 | Wark et al. | |
| 2004/0020359 A1 | 2/2004 | Koermer et al. | |
| 2004/0060915 A1 | 4/2004 | Maeda | |
| 2004/0084294 A1 | 5/2004 | Hogan | |
| 2007/0089283 A1 | 4/2007 | Wilson et al. | |
| 2007/0261303 A1 | 11/2007 | Surma et al. | |
| 2007/0266633 A1 * | 11/2007 | Tsangaris et al. | 48/197 R |
| 2007/0289509 A1 | 12/2007 | Vera | |
| 2008/0059093 A1 | 3/2008 | Bromberg et al. | |
| 2008/0097137 A1 | 4/2008 | Chapman et al. | |
| 2008/0135457 A1 * | 6/2008 | Ridge | 208/427 |
| 2008/0182912 A1 | 7/2008 | Van Den Berg et al. | |
| 2008/0251234 A1 | 10/2008 | Wilson et al. | |
| 2009/0000190 A1 | 1/2009 | Surma et al. | |
| 2009/0020456 A1 | 1/2009 | Tsangaris et al. | |
| 2009/0133407 A1 | 5/2009 | Sawyer | |
| 2009/0159818 A1 | 6/2009 | Klemm et al. | |
| 2010/0011664 A1 | 1/2010 | Ariyapadi et al. | |
| 2010/0300871 A1 | 12/2010 | Batdorf et al. | |
| 2011/0126460 A1 | 6/2011 | Bromberg et al. | |

FOREIGN PATENT DOCUMENTS

| | | |
|---|---|---|
| WO | 2010/138494 A1 | 12/2010 |
| WO | 2010/138516 A1 | 12/2010 |
| WO | 2010/138629 A1 | 12/2010 |

OTHER PUBLICATIONS

Quapp, W. J., et al., "Waste Gasification—Test Results from Plasma Destruction of hazardous, electronic and medical wastes", International Thermal Treatment Technologies 2003 Conference, May 16, 2003, XP002611722, Orlando, Florida.

International Search Report and Written Opinion dated Sep. 15, 2010 in co-pending application (PCT/US10/36044).

International Search Report and Written Opinion dated Jul. 20, 2010 in corresponding application (PCT/US10/36085).

Supplementary European Search Report dated Aug. 1, 2013 for EP Application No. 10 78 1095.4.

Extended European Search Report for EP appl. No. 10781079.8 dated Nov. 3, 2014.

EP Office Action received in EP Appl. No. 10 781 095.4 mailed Jan. 26, 2015.

* cited by examiner

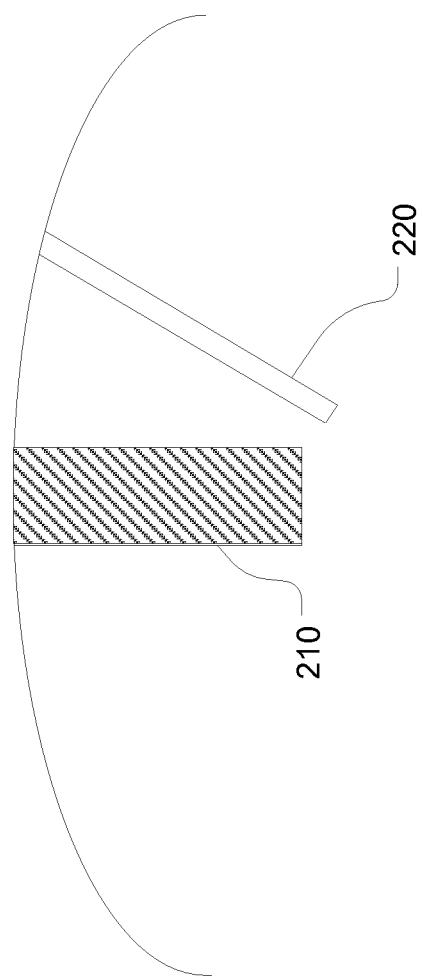

HIGH PRESSURE GASIFIER SYSTEM USING ELECTRICALLY ASSISTED HEATING

This application claims priority of U.S. Provisional Patent Application 61/181,099, filed May 26, 2009, the disclosure of which is incorporated herein by reference.

BACKGROUND

The generation of waste, particularly solid waste has become an increasingly worrisome environmental issue. Many landfills are becoming filled to the point where additional waste cannot be deposited therein. In addition, much of today's solid waste is not readily biodegradable, implying that the waste will not decompose in a timely manner. As an alternative, incinerators have been employed to burn solid waste, so as to minimize its physical footprint. However, these incinerators burn the waste and generate air pollutants that require very extensive gas cleanup, create ash that can be hazardous, and produce energy only in the form of heat, which is converted into electricity.

Plasma gasifiers offer an alternative to these current approaches. Plasma gasifiers use intense electrically based heating to enhance a gasification and melting process which produces a synthesis gas (syngas) consisting of hydrogen and carbon monoxide. Inorganic material is converted into a non-leachable glass. After cleaning, the synthesis gas can be preferably converted into a variety of liquid fuels or else combusted to produce electricity. Cleaning of the synthesis gas and recovering heat from the syngas can be a key part of the process.

FIG. 1 shows a representative plasma gasifier system. The plasma gasifier system 100 includes a reactor vessel 110, which is typically refractory lined. Within the vessel 110 are two or more electrodes 120a, 120b that are in electrical communication with one or more power supplies 130. In some embodiments, one electrode is suspended from the top of the reactor vessel 110, while the other electrode 120b is located at the bottom of the vessel. The power supplies create a significant electrical potential difference between the two or more electrodes, so as to create an arc. As waste is fed into the vessel 110 via a waste handler 140, it is exposed to extreme temperatures, which serve to separate the waste into its component parts.

The bottom of the vessel 110 contains molten metal 145. An area above the molten material forms an inorganic slag layer 147. Gasses, such as carbon monoxide and hydrogen gas, are separated and exit the vessel though portal 150. The gas, commonly known as syngas, exits the vessel 110 at an excessive temperature. Since the gas has not been processed, it is also referred to as dirty syngas. The syngas is cooled in a scrubber unit 180 to allow other particulates in the gas, such as carbon or sulfur to precipitate out of the gas. Halogens and acidic materials are removed from the syngas. The resulting gas is now referred to as clean syngas. The clean syngas can then be used to fuel a boiler or other device.

The plasma gasifier may also include joule heating of the molten material by passage of current between two or more electrodes that are immersed in the molten material 145.

In some embodiments, it may be advantageous to operate these plasma gasifiers at elevated pressure. While the throughput of the device is partially limited by the plasma power, it is possible to ease the requirements of the upstream/downstream gas handling equipment and the downstream catalyst by operating at elevated pressure of greater than one bar. For a given size, operating at increased pressure results in increased residence time, which is useful in achieving better mixing and increased conversion rates. Alternatively, the gas handling components of the system could be reduced in size, while maintaining a constant residence time, by operating at increased pressure. Operation at a slightly elevated pressure, such as 5 bar, is advantageous, as most of the advantages of higher pressure operation are obtained at this level, including a decrease in equipment size (such as pressure vessels and catalytic reactors used, for example in manufacturing liquid fuels). An optimum pressure range can be up to 10 bar, such as between 3 and 7 bar.

Operation at this higher pressure also helps regenerators used for heat recovery, due primarily to the reduced gas flow rates needed to exchange a given amount of energy.

Operation of a plasma gasifier at high pressure is inhibited by its adverse effect of the plasma characteristics. The high pressure operation of an arc plasma makes breakdown difficult and reduces the cross section of the arc plasma. For gasifier applications, it is disadvantageous that the plasma cross section decreases at elevated pressure with increased impedance. This decrease in size results in increased central temperatures, and increased interaction with the electrode materials. In addition, if the plasma is used to treat gas or liquids, there is reduced interaction with the environment due to the reduced cross sectional area. High pressure operation also results in plasma instability, where continuous plasma operation is difficult and the plasma extinguishes.

Therefore, there is a need for an effective apparatus and method to enable the advantages of high pressure operation, while overcoming the drawbacks listed above.

SUMMARY OF THE INVENTION

The problems of the prior art are overcome by the apparatus and method disclosed herein. The reactor vessel of a plasma gasifier is operated at high pressure. To compensate for the negative effects of high pressure, various modifications to the plasma gasifier are disclosed. For example, gasses are added to the plasma to stable its operation. In another embodiment, means are used to move the slag, allowing more material is exposed to the plasma, resulting in better and more complete processing thereof, and better ingestion of the solid on the surface of the slag. In other embodiments, additional heating, such as microwave heating is used to augment the temperature of the slag.

BRIEF DESCRIPTION OF THE DRAWINGS

FIG. 2A-C show several embodiments used to inject a plasma gas additive; and

DETAILED DESCRIPTION OF THE INVENTION

As described above, the use of high pressure within the reactor vessel can have many advantages in the downstream process. However, the use of high pressure adversely affects the plasma size, which reduces the area exposed to the plasma. A number of techniques can be used to improve high pressure operation.

Operation at high pressure is facilitated by combining high pressure with high ambient temperature. This is because the important parameter in determining plasma properties is number density (number of molecules per unit volume), rather than pressure. Thus, by operating at 900 degrees Kelvin and 3 bar, the plasma has comparable properties (size, voltage drop, electric field in the free-plasma region, initial breakdown) to operating at 1 bar and 300 degrees Kelvin. Placing the plasma in a hot environment facilitates initial plasma breakdown, and helps sustain a stable plasma. Combining plasma with oxidation results in improved plasma performance. It is best to apply the oxygen close to the electrode, but sufficiently away to prevent excessive oxidation of the electrode, which can be made of multiple materials, with graphite being a preferred material.

In addition, thermal stratification (where the gas in the region near the plasma is hotter than elsewhere) of the gases, either intentional or naturally occurring, further facilitates the plasma operation.

Gas stratification may also be used to improve high pressure operation. In one embodiment, a gas, different from the bulk of the gas in the gasifier section, is injected in the neighborhood of the electrode that is not submerged. This gas, referred to as the plasma gas additive or simply the gas additive, displaces a fraction of the gasifier gas in the region near the plasma. It is the purpose of the gas additive to stabilize the discharge and facilitate discharge initiation. In some embodiments, the gas additive can be a noble gas, such as Argon or Helium. In other embodiments, it can be a gas with limited thermal conductivity or low ionization energy. In some embodiments, in order to minimize gas dilution, the plasma gas additive does not exceed more than 5% the flow rate of hydrogen rich gas. In one embodiment, the composition of the gas additive comprises one or more of the constituents of the syngas. For example, high temperature carbon monoxide, carbon dioxide, steam, high temperature hydrogen gas or a blend of the above mentioned gases may serve as the plasma gas additive, and be introduced to the gasifier in the region near the plasma zone. However, it is not intended to exclude other high temperature gases, such as the noble gases mentioned above. By injecting the plasma gas additives at high temperature, the mass flow of these gases, for a given gas velocity and pressure, can be decreased, and the high temperature further helps in stabilizing the plasma.

Figure 2B:
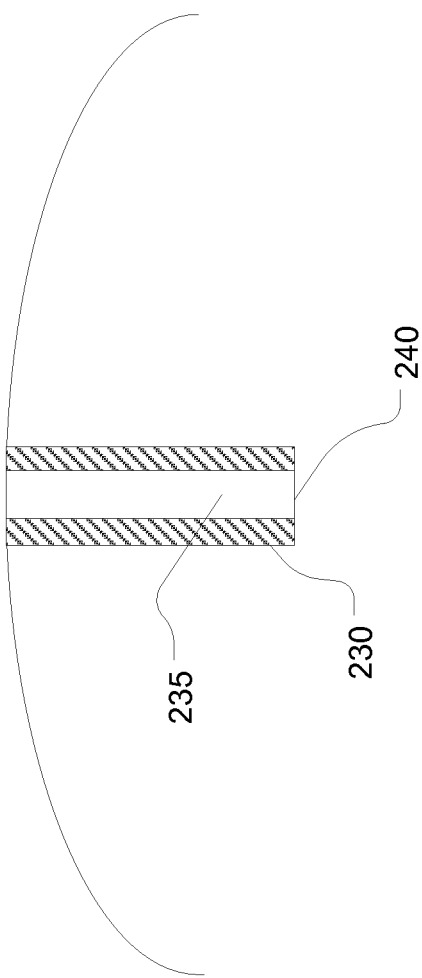
Figure 2C:
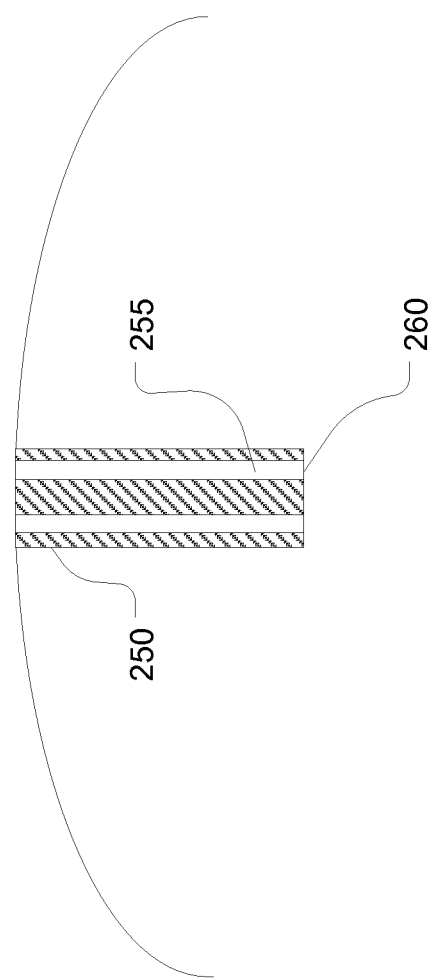

FIGS. 2A-C show an expanded view of the upper electrode of the reactor vessel 110. As shown in FIG. 2A, the plasma gas additive can be added through ports (lances) 220 separated from, but preferably near the electrode 210. In another embodiment, the plasma gas additive is added by channels/lances located in the electrode itself. As shown in FIG. 2B, the port/lances 240 for the plasma gas additive can also be through the central region 235 of a hollow cylinder electrode 230. In another embodiment, the gas additive flows through one or multiple channels 255 along the electrode 250, terminating in ports/lances 260. The plasma discharge channel prefers to flow through regions that result in minimization of the electric field along the discharge, and the gas composition and/or temperature can be used to guide the plasma. Since the discharge parameters depend on the ratio of E/N (where E is the electric field and N is the number density of molecules in the gas), providing gradients in the temperature and/or composition can be used to stabilize the plasma operation at higher pressures. The gradients in temperature and/or composition are established by introducing a gas additive that is substantially hotter and/or of different composition than the gasifier gas.

Another method to improve the performance of high pressure gasifiers is to heat the incoming solids, so that when ingested into the liquid phase, the temperature of the liquids are not reduced, but augmented instead. In some embodiments, it may be desirable to maintain the temperature of the liquid in a narrow range to best process the slags. By preheating the solids to the appropriate temperature, it is possible to prevent excursions in the temperature of the slag. For example, if the slag is too cold, the slag viscosity will be too low and ingestion of the solids is difficult/slow. If the slag is too hot, the fluxes desired to make high quality glass may be evaporated from the slag.

The amount of the plasma gas is minimized by the high temperature of the plasma, which increases the viscosity of the gas. Thus, the plasma gas and the gas in its surroundings do not exchange gas efficiently with the background, thus minimizing the gas flow rate required to establish/maintain the gradient in temperature/species, and thus maintain a stable plasma at high pressure. In the case of the hollow cylinder, with plasma additive entering through the central region, as shown in FIG. 2B, the root of the plasma discharge should occur in the inboard zone of the electrode.

Another way to address the issues associated with high pressure plasma gasification is to either move the plasma around, or move the materials that the plasma is treating such that the plasma contacts more of the material. Increased motion of gasses can be achieved by inducing motion in the chamber. In order to move liquids, forces must be applied to the slag/metal layers. Motion can be induced in the liquid if there are currents flowing through it, as is the case when a Joule heating system is used. In the case of the plasma, it is best if the plasma is a transferred discharge, that is, if the slag/metal is effectively one of the electrodes of the arc discharge, with currents flowing through it. By imposing a magnetic field, it is possible to induce motion due to the Lorenz forces generated by the interaction between the current and the imposed magnetic field.

The motion of the slag allows for material to be better incorporated into the slag, including partially melted solids that lie on the surface of the slag. Motion also results in more homogeneous temperatures and composition, due to mass and heat transfer, resulting from either turbulence or shears in the flow.

Figure 1:
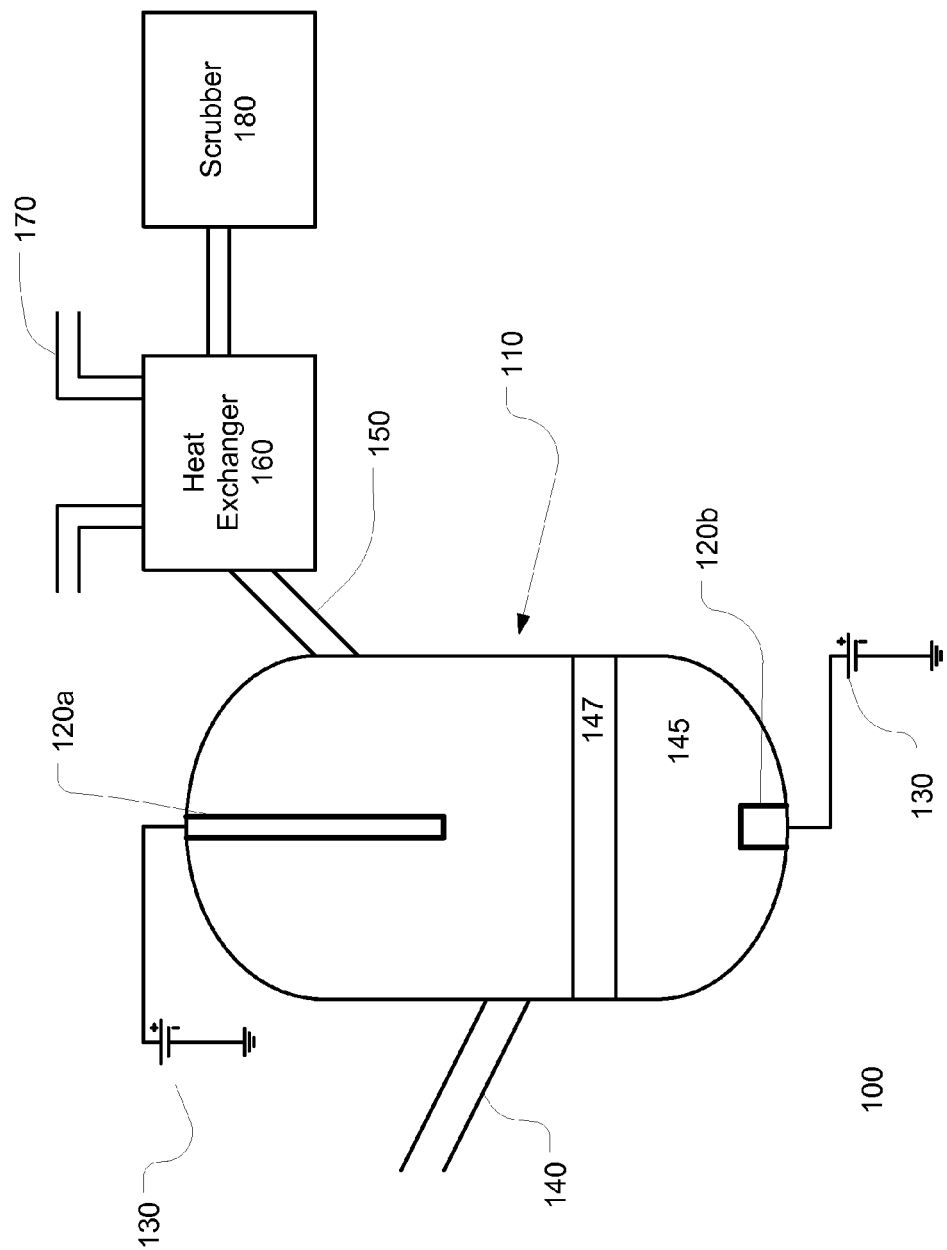
FIG. 1 shows a plasma gasifier system which can be used with the present invention.

In the case of DC arc, which is a preferred embodiment, the application of DC magnetic fields will result in motion of the slag. The slag layer 147 (see FIG. 1) is highly viscous, and a substantial magnetic field may be needed to create the motion of the slag. In addition, the slag may be stress thinning, that is, a non-Newtonian fluid such that the viscosity decreases as shears occur within the slag. In this case, it may be necessary to apply a larger force to get the slag moving. Once moving, it may be possible to decrease the current of magnetic field that generated the Lorenz force. The DC arc is generated by placing two separated electrodes, with an electric circuit between the two electrodes. The electrically conducting liquid at the bottom of the gasifier serve as one of the plasma electrodes. The electric circuit includes connections to one or more power supplies, controls and safety mechanisms. The DC power supply can be aided by an RF source that is used only to aid in the initial plasma breakdown.

If joule heating is performed with an AC current, it is also possible to generate a DC force if the magnetic field is also AC and synchronized with the current. In this way, the forces remain in the same direction, as both the magnetic field and the plasma current reverse directions simultaneously.

The magnetic field may be created through the use of coils external to the reactor vessel. By controlling the magnitude and direction of the current through the coils, a magnetic field that is synchronized with the current flowing in the slag. In the case of AC, low frequencies are needed such that the magnetic field penetrates through the electrically conducting elements, such as the metallic vessel, or the metal liquid at the bottom of the gasifier.

The motion can be applied to either the slag layer 147, or on the molten metal layer 145. It is likely that motion of the molten metal will result in motion of the slag. The plasma may provide very effective heating of the surface of the slag layer, facilitating ingestion of the partially molten solids and decreasing the viscosity of the slag and its surface. With lower viscosity, it is easier to make the slag flow, which may be necessary for continuous processing. In some of the gasification processes, the operating temperature of the slag is selected in order to reduce the viscosity of the slag, so that it can flow. Because of the very localized heating of the plasma, in a plasma based furnace system, it is possible to provide this heating without having to heat the entire gas flow, which may be at lower temperatures.

It is possible to combine synergistically additional heating with the plasma. In particular, microwave heating, such as in the high MHz and low GHz range (S-band), is attractive, because of the availability of inexpensive components, due to the large microwave heating market. Inexpensive, high power sources are available at frequencies up to 10 GHz, such as 460 MHz, 750 MHz, 915 MHz, 2.45 GHz and 5.8 GHz, among others. It is possible to locate the launching structures behind the liner in the gasifier, and thus protect the launching structure from the corrosive high temperature gases in the gasifier. Multiple materials can be used as liners, with adequate transmission at the operating temperatures and frequencies. Alumina has low loss-tangent, even at 2.45 GHz, and even lower at the lower frequencies. Other materials, such as corderiete, may also be used. For best performance, it is best if the liners are not electrically conducting, in order to minimize absorption by the liner. If a conducting liner is used, such as SiC or graphite, it is necessary to provide insulation between different sections of the liner, each section of the liner operating as an antenna, with at least one section connected to the RF source.

Figure 3A:
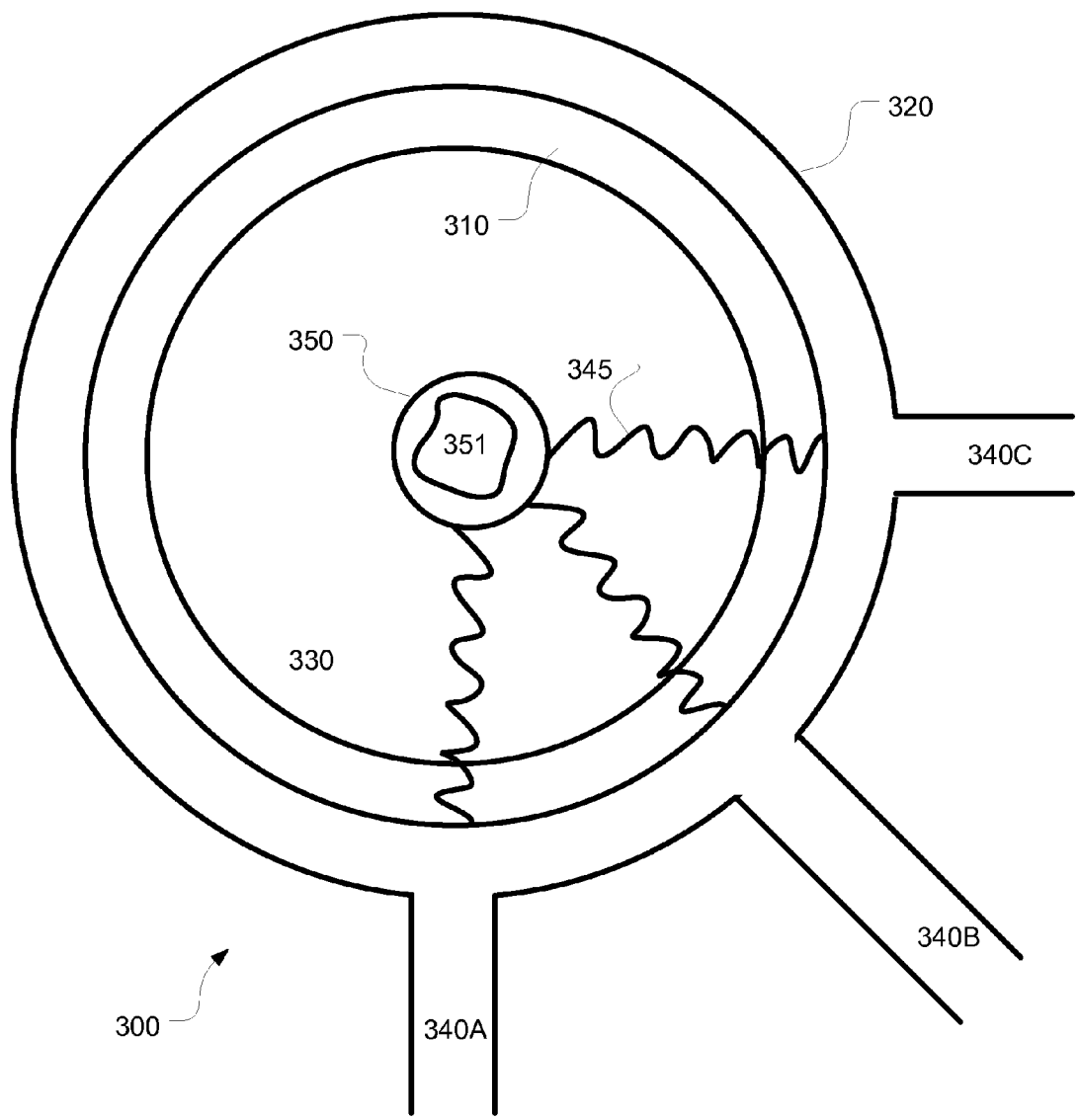
FIG. 3A-B show several embodiments used to launch microwaves into a plasma gasifier.
Figure 3B:
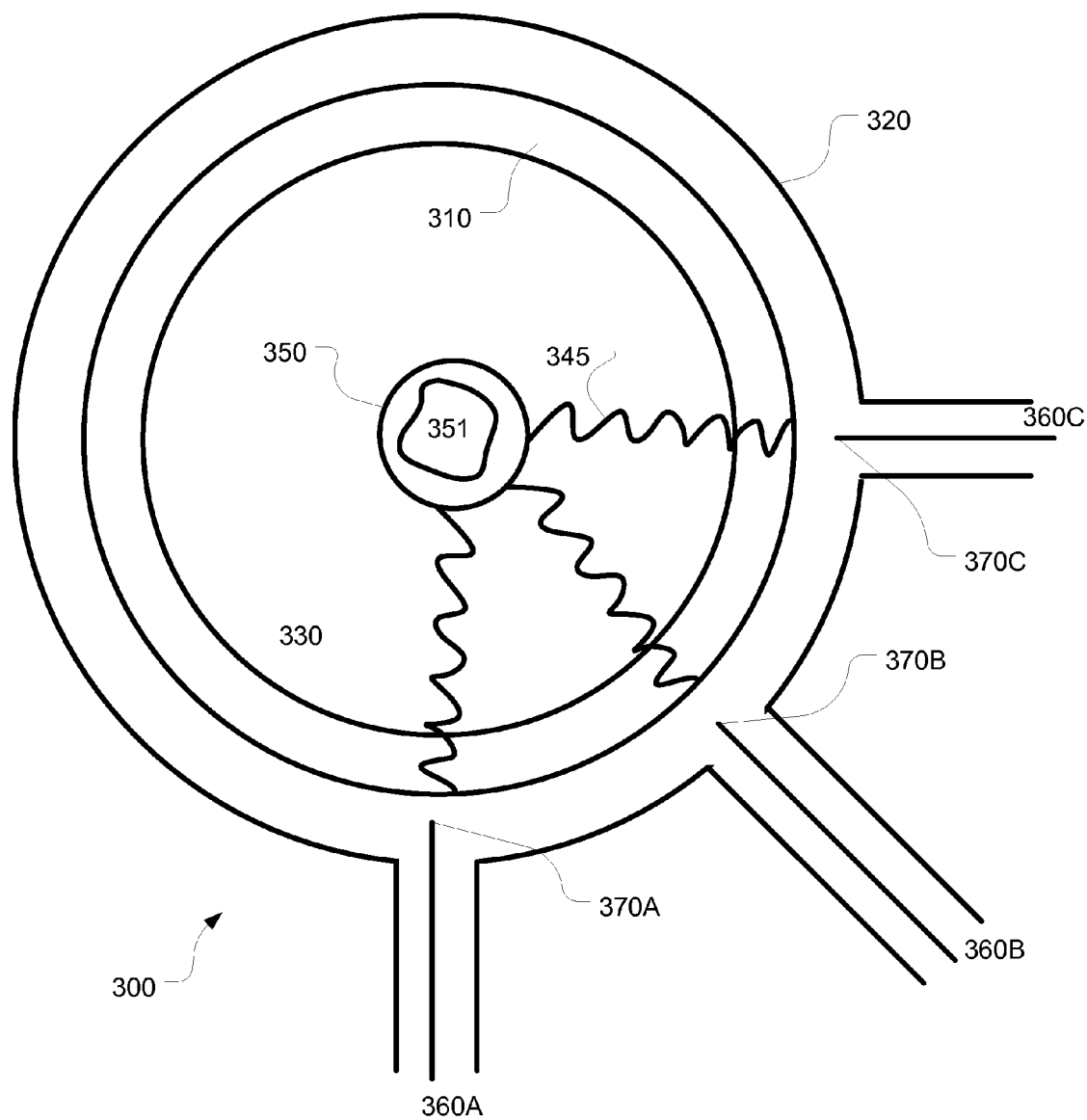

FIG. 3A shows the case when the microwave is launched with waveguides, while in FIG. 3B, the microwaves are launched by antennas. Both figures show a top view of the gasifier 300. The gasifier 300 includes a reactor vessel, with a liner 310 located between the cavity 330 of the vessel and the conductive walls 320 of the vessel. The gasifier chamber 300 is heated with a DC plasma 351, and in addition with microwaves 345. The waveguides 340A, 340B and 340C are placed behind a dielectric liner 310 to protect them from the gasifier environment. It is intended to use frequencies such that the cavity 330 formed by the external conducting shell 320 is overmoded. In FIG. 3A, the phases of multiple waveguides 340A-C are adjusted in order to generate a region of strong electric field 350, where there is strong heating.

Similarly, in FIG. 3B, the antennas 370A, 370B and 370C, also located behind a dielectric liner 310, are fed by coaxial feeds 360A, 360B and 360C. The antenna 370A-C launch microwaves that generate a region of strong electric field 350. It is possible to use a single waveguide or antenna, but in this case, it may not be possible to scan or vary the region 350 of strong electric fields. The signals fed through different sections can have different amplitudes and/or frequencies. It should be noted that, in both embodiments, the microwaves are adjusted to generate a region of strong electric field 350. In some embodiments, it is beneficial that the plasma 351 is located within this region 350.

In the case of a conducting liner, as mentioned above, the antennas need to be connected to a section of the liner that is electrically insulated from the rest of the liner and the metallic vessel wall. It is possible that a gap can be used in the section close to the gasifier, with an insulating region in between sections of the launching structure. Alternatively, sections of the electrically conducting liner can be used as loop antennas, with two separate coax lines feeding the loop antenna.

The plasma can be in region 350 of strong RF fields, if the objective is to provide additional heating to the plasma.

Microwave heating may also be used for augmented heating at the plasma region, which is very absorbing at these frequencies. The goal would be to illuminate most of the plasma, but the plasma size is small compared to the wavelength. Thus, the microwave heating can be used to augment or stabilize the plasma discharge, by appropriately phasing the launching structure so that there is a strong peaking of the microwave radiation in the area of the plasma. The goal of combining the plasma discharge and the microwave heating is to stabilize the discharge, heat the surrounding area of the plasma (in order to decrease the number density of the plasma discharge, or E/N), and decrease electrode erosion by providing some of the needed heating. Since the power supplies for microwave sources in this frequency range are inexpensive, and may be less expensive and more efficient than those needed to generate and or maintain the DC plasma, exchanging DC arc power for microwave power may also decrease operating and capital costs.

The microwave radiation can be steered by using phase arrays, that is, launching structures with appropriate phasing. This approach offers additional operational possibilities for gasifiers, as the location of the heated area can be adjusted, as long as there is absorbing material in the region of interest. Typically, the region of interest may be the solids, slag or the plasma.

It is also possible to use the microwave energy to heat directly the slag surface. Better ingestion of the solids occurs by decreased viscosity of the slag. This decreased viscosity is a result of increased temperature at the surface, enabled by the use of plasma heating (radiation). Additionally, or alternatively, microwave energy, which will be absorbed in a relatively thin layer on the surface of the slag, also serve to decrease its viscosity. Thus, temperature of the slag can be adjusted by use of microwave heating, and the heated zone on the surface of the slag adjusted by moving the region 350 of strong electric fields in the gasifier volume.

Alternatively or additionally, the microwave radiation can be used to directly heat the solids as they are introduced into the chamber, or while they are sitting on top of the slag before they are ingested by the slag. Soot is relatively absorbing, especially in the higher frequency of interest. The frequencies of interest are from 100 MHz, which corresponds to a wavelength of about 3 m, or half-wavelength of 1.5 m, to 10 GHz, which corresponds to a wavelength and half-wavelength of 3 and 1.5 cm, respectively. At the lower frequencies, the chamber may function as a microwave cavity, and use different modes, with peaks and valleys of the electric field determined by the mode structure. At higher frequencies, steering of the microwave can be achieved through phasing of the multiple launching structures.

The launching structures can be waveguides, as shown in FIG. 3A or can be antennas, as shown in FIG. 3B, or a combination of the two.

The microwave heating can be used in conjunction with plasma heating, as described above. In other embodiments, it can be used in lieu of plasma heating. When it is used instead of plasma heating, it can be combined with joule heating, where multiple electrodes are immersed in the molten material and heating is through Joule dissipation by currents flowing in the liquid. In order to achieve best heating of the slag without the plasma, it is useful to adjust the properties of the slag, mainly the absorption. If the slag is too conducting, the microwaves reflect. It is the goal of the invention to operate with modes away from fundamental. When the absorption is high, the gasifier chamber does not operate as a resonator. As opposed to the plasma heating, that has a relatively narrow power window (as the current increases, in general, the voltage decreases, and the arc power can not be controlled over a wide range), microwave heating can be adjusted easily. Either pulse-width modulation, or with more sophisticated power supplies, by changing the CW power, can be used to adjust the microwave heating power.

In the case of multiple waveguides/antennas, a single power supply can be used, with power splitters. The relative frequency between the multiple launchers can be adjusted using simple elements, such as stub tuners.

In other embodiments, plasma heating can be used during a portion of the time, plasma heating/microwave heating can be used during a different portion of the time, or microwave heating can be used during a third portion of the time. In other words, microwave heating and plasma heating can be used independently or simultaneously in some embodiments. When used at the same time, plasma heating and microwave heating can be used so that the microwave heating stabilizes/augments the plasma heating, or the microwave heating is used to heat the solids or the slag. Microwave heating is not sensitive to the operating pressure of the gasifier. Microwave heating of the plasma discharge allows stable plasma operation at higher pressures than possible when it is not used.

In the case of combined plasma heating and microwave heating, the microwaves can be launched from the inside of a hollow electrode, such as the one shown in FIG. 2B. As noted above, graphite is a good electrical conductor, and efficient transport of the microwave to the plasma region in either coaxial graphite conductors, or graphite waveguides.

Several embodiments are disclosed. Those of the art will recognize that the present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A plasma gasification system configured to produce synthesis gas from waste, the gasification system comprising:
    a reactor vessel configured to receive the waste;
    a first electrode and a second electrode disposed inside the reactor vessel and configured to generate an arc between the first electrode and the second electrode, wherein the arc is configured to plasma heat the waste;
    a control unit configured to maintain the reactor vessel at a pressure greater than one bar;
    a microwave launching system configured to emit microwaves into the reactor vessel, the microwave launching system having a plurality of launching structures positioned and configured to converge microwave radiation in a region where plasma is located inside the reactor vessel; and
    coils configured external to the reactor vessel, wherein the coils are configured to provide a magnetic field,
    wherein the magnetic field is configured to provide movement of slag or the plasma in the system.

2. The plasma gasification system of claim 1, wherein the control unit is configured to maintain the reactor vessel at a pressure between 3 bar and 7 bar.

3. The plasma gasification system of claim 1, further comprising a port configured to introduce a gas additive into the reactor vessel during gasification.

4. The plasma gasification system of claim 3, wherein the gas additive is a noble gas, and wherein the noble gas is added in the neighborhood of the plasma electrode.

5. The plasma gasification system of claim 1, further comprising a channel in the first electrode configured to introduce a gas additive.

6. The plasma gasification system of claim 1, wherein a gas additive is added in the neighborhood of the electrode, and wherein the Joule heating system is configured to heat slag formed in the reactor vessel.

7. A gasification system configured to produce synthesis gas from waste, the gasification system comprising:
    a reactor vessel having a cavity configured to receive waste;
    a plurality of electrodes penetrating the reactor vessel and configured to generate an arc inside the cavity, wherein the arc is configured to heat the waste using plasma;
    a microwave launching system configured to emit microwaves into the cavity of the reactor vessel, the microwave launching system having a plurality of launching structures positioned and configured to converge microwave radiation in a region where the plasma is located; and
    coils configured external to the reactor vessel, wherein the coils are configured to provide a magnetic field,
    wherein the magnetic field is configured to provide movement of slag or the plasma in the system.

8. The gasification system of claim 7 further including one or more joule heating electrodes configured to provide joule heating of slag formed in the reactor vessel.

9. The gasification system of claim 7, further comprising a control unit configured to maintain the reactor vessel at a pressure greater than one bar.

10. The gasification system of claim 9, wherein the control unit is configured to maintain the reactor vessel at a pressure between 1 bar and 10 bar.

11. The gasification system of claim 7, wherein the microwave launching system is configured to emit microwave radiation having a frequency between 100 MHz and 10 GHz.

12. The gasification system of claim 7, wherein the plurality of launching structures include appropriate phasing configured to control a direction of the microwave radiation emitted therefrom.

13. The gasification system of claim 7, further comprising joule heating electrodes configured to heat slag by passing current between the joule heating electrodes immersed in the slag.

14. The gasification system of claim 7, further comprising a liner in the reactor vessel, and wherein the microwave launching system is located behind the liner.

15. The gasification system of claim 7, wherein one or more of the plurality of electrodes is a hollow graphite electrode and wherein one of the plurality of launching structures in the microwave launching system is positioned and configured to emit microwaves from inside the hollow graphite electrode.

16. The plasma gasification system of claim 1, further comprising one or more joule heating electrodes configured to provide joule heating of slag formed in the reactor vessel, wherein the joule heating electrodes are configured to provide an AC current, wherein the coils are further configured to synchronize the magnetic field with the AC current.

17. The gasification system of claim 12, wherein the plurality of launching structures includes a phase array, and wherein the phase array is configured to adjustably steer microwave radiation toward the region where the plasma is located.

18. The gasification system of claim 12 wherein the microwave launching system is further configured to heat the waste.

19. The gasification system of claim 1 wherein the magnetic field is configured to move a plasma in the system.

20. The gasification system of claim 1 wherein the magnetic field is configured to move slag formed in the reactor vessel.

21. The gasification system of claim 12, wherein the plurality of launching structures are adjustably tunable to adjust the location of a heated area provided by the microwave radiation during operation of the gasification system.

22. The gasification system of claim 1, wherein either the first or the second electrode comprises a conducting liquid.

23. The gasification system of claim 1, wherein the coils are configured to synchronize the magnetic field with the current flowing within a slag formed inside the reactor vessel.

\* \* \* \* \*